US012730342B2

(12) United States Patent
Sasa

(10) Patent No.: US 12,730,342 B2
(45) Date of Patent: Sep. 8, 2026

(54) OPTICAL SHEET, BACKLIGHT UNIT, LIQUID CRYSTAL DISPLAY APPARATUS, AND INFORMATION DEVICE

(71) Applicant: KEIWA Inc., Tokyo (JP)

(72) Inventor: Kenta Sasa, Tokyo (JP)

(73) Assignee: KEIWA Inc., Tokyo (JP)

( * ) Notice: Subject to any disclaimer, the term of this patent is extended or adjusted under 35 U.S.C. 154(b) by 0 days.

(21) Appl. No.: 18/613,543

(22) Filed: Mar. 22, 2024

(65) Prior Publication Data

US 2024/0231147 A1 Jul. 11, 2024

Related U.S. Application Data

(63) Continuation of application No. 17/978,632, filed on Nov. 1, 2022, now Pat. No. 11,966,117, which is a continuation of application No. PCT/JP2021/019000, filed on May 19, 2021.

(30) Foreign Application Priority Data

May 22, 2020 (JP) ................................ 2020-089793
May 12, 2021 (JP) ................................ 2021-080905

(51) Int. Cl.
*G02F 1/13357* (2006.01)
*G02F 1/1335* (2006.01)

(52) U.S. Cl.
CPC .... *G02F 1/133606* (2013.01); *G02F 1/13356* (2021.01)

(58) Field of Classification Search
CPC .......... G02F 1/133606; G02F 1/13356; G02F 1/133504
See application file for complete search history.

(56) References Cited

U.S. PATENT DOCUMENTS 11,287,694 B2 * 3/2022 Nonaka ............ G02F 1/133507
2001/0036068 A1 11/2001 Suzuki et al.
2002/0154087 A1 10/2002 Katsu et al.
2016/0236974 A1 8/2016 Sinapi et al.
2017/0160446 A1 6/2017 Nonaka
2018/0207907 A1 7/2018 Okabe
(Continued)

FOREIGN PATENT DOCUMENTS

JP 2001-312213 A 11/2001
JP 2002-324420 A 11/2002
(Continued)

OTHER PUBLICATIONS

JP 2010224251 A machine translation (Year: 2010).*
(Continued)

*Primary Examiner* — James A Dudek
(74) *Attorney, Agent, or Firm* — JCIPRNET

(57) ABSTRACT

An optical sheet 5 is an optical sheet, at least a first surface of the optical sheet has unevenness. A sparkle contrast of the first surface measured in conformity with JIS C 1006: 2019 is 4% or less. An arithmetic average roughness Ra of the first surface measured in conformity with JIS B 0601: 2001 (with an assessment length set to 290 μm) may be 0.6 μm or less. A peak count RPc of the first surface measured in conformity with JIS B 0601: 2001 (with an assessment length set to 290 μm) may be 16 or more.

9 Claims, 6 Drawing Sheets

(56) References Cited

U.S. PATENT DOCUMENTS

| | | | |
|---|---|---|---|
| 2020/0150317 | A1 | 5/2020 | Huckaby et al. |
| 2021/0149252 | A1 | 5/2021 | Nonaka et al. |

FOREIGN PATENT DOCUMENTS

| | | | |
|---|---|---|---|
| JP | 2005-077448 | A | 3/2005 |
| JP | 2009-103734 | A | 5/2009 |
| JP | 2009-109702 | A | 5/2009 |
| JP | 2010-060889 | A | 3/2010 |
| JP | 2010-224251 | A | 10/2010 |
| JP | 2016-133722 | A | 7/2016 |
| JP | 2016212191 | | 12/2016 |
| JP | 2017107193 | | 6/2017 |
| JP | 6520114 | | 5/2019 |
| KR | 10-2017-0067149 | A | 6/2017 |
| TW | 201727324 | A | 1/2017 |
| TW | 201706683 | A | 2/2017 |
| WO | WO 2016/136871 | A1 | 9/2016 |
| WO | WO 2018/225463 | A1 | 12/2018 |

OTHER PUBLICATIONS

JP 2010060889 A machine translation (Year: 2010).*
U.S. Appl. No. 17/978,632, filed May 19, 2021, 2023/0052606, Allowed.
International Search Report and Written Opinion for International Application No. PCT/JP2021/019000 (ISA/JP) dated Jul. 13, 2021 w/English translation (19 pages).

* cited by examiner

OPTICAL SHEET, BACKLIGHT UNIT, LIQUID CRYSTAL DISPLAY APPARATUS, AND INFORMATION DEVICE

CROSS-REFERENCE TO RELATED APPLICATIONS

The present disclosure is a continuation of U.S. application Ser. No. 17/978,632, filed Nov. 1, 2022, which application is further a continuation of International Application No. PCT/JP2021/019000, filed on May 19, 2021, which application claims priority to and the benefit of Japanese Patent Applications Nos. 2020-089793 and 2021-080905, filed on May 22, 2020, and May 12, 2021, respectively. The entire disclosures of all these applications are hereby incorporated by reference herein in their entirety.

BACKGROUND

Related Field

The present disclosure relates to an optical sheet, a backlight unit, a liquid crystal display apparatus, and an information device.

Related Art

In recent years, liquid crystal display apparatuses (hereinafter sometimes referred to as LCDs (liquid crystal displays)) have been widely used as display devices for various information devices such as smartphones and tablet terminals). A backlight unit (hereinafter sometimes referred to as BLU) of an LCD is mostly a direct type in which the light source is provided behind a liquid crystal panel, or an edge-light type in which the light source is provided beside a side surface of the liquid crystal panel.

A known edge-light type BLU 101 illustrated in FIG. 12 includes light sources 102, a quadrangular plate-shaped light guide plate 103, which is placed in such a way that an end portion thereof aligns with the light sources 102, a plurality of optical sheets 104 laminated together and disposed on a front surface side of the light guide plate 103, and a reflective sheet 105 disposed on the back surface side of the light guide plate 103. The light guide plate 103 is typically made of synthetic resin, and polycarbonate, acrylic resin, or the like may be employable as a main component of the light guide plate 103. The light sources 102 may be LEDs (light-emitting diodes), cold cathode tubes, or the like, but LEDs are widely used these days for the sake of miniaturization and energy savings. The plurality of optical sheets 104 includes (1) an underlying light diffusion sheet 106, which is laminated on the front surface side of the light guide plate 103 and mainly has a light diffusion function, (2) a prism sheet 107 laminated on the front surface side of the underlying light diffusion sheet 106 and having a refractive function for directing light in a normal direction, and (3) an overlying light diffusion sheet 108, which is laminated on the front surface side of the prism sheet 107 so as to slightly diffuse light rays, thereby suppressing luminance unevenness attributed to shapes of prism parts of the prism sheet 107, or the like (see Japanese Unexamined Patent Publication No. 2005-77448). The overlying light diffusion sheet 108 typically includes a base layer and a light diffusion layer being laminated on the front surface side of the base layer and having a resin matrix and resin beads.

BRIEF SUMMARY

It is known that, in a display screen of an LCD, an interference between an optical sheet used for a BLU and a liquid crystal panel would occur to cause a phenomenon called sparkle (also known as "sasamura", "glare", or "fine luminance unevenness") that deteriorates a display quality. It is considered that such sparkle would be caused by interference between uneven surface of the overlying light diffusion sheet, which constitutes the uppermost surface of the BLU, and an array of cells (pixels) in the liquid crystal panel. Furthermore, reduction of cell array pitch along with development of higher definition liquid crystal panels in recent years results in that the sparkle easily occurs. The same problem is pointed out not only in the display screens of the LCDs but also in other various display devices."

Therefore, an object of the present disclosure is to provide an optical sheet capable of suppressing the sparkle on a display screen.

As a result of diligent studies by the inventor of the present application in order to achieve the object, the inventor found that, in the LCD, the sparkle can be reduced as compared to the conventional products, by configuring a diffusion agent to be contained in the light diffusion layer of the overlying light diffusion sheet in such a way that the diffusion agent is downsized to be smaller than approximately 7 μm in particle diameter and is as uniform as possible in particle diameter. Moreover, it is found that, even when the diffusion agent (resin beads) is downsized in particle diameter as such, unevenness (surface roughness, and the like) of the surface of the overlying light diffusion sheet become larger and the sparkle is not sufficiently reduced if the surface is in such a state that areas with beads aggregated and sparse areas with not much beads are present (such a state is called "sea-island state").

To address this, the inventor of the present application modified an optical sheet by more finely spreading even finer resin beads of, for example, approximately 2 μm or less to prepare an optical sheet without aggregation of beads (islands in the sea), that is, an optical sheet with beads placed uniformly, and employed this optical sheet as the overlying light diffusion sheet of the LCD (BLU), thereby successfully achieving stable reduction of the sparkle. More specifically, it was possible to suppress a sparkle contrast to about 4% or less, where the sparkle contrast was measured in conformity with JIS C 1006: 2019. Furthermore, it was found that the optical sheets with such unevenness that provides a stable sparkle reduction effect are not limited to those formed by dispersing the resin beads in a resin matrix, but can also be formed by molding, laser-printing, or the like.

An optical sheet according to the present disclosure has been made on the basis of the findings described above. More specifically, the optical sheet is such that at least a first surface of the optical sheet has unevenness, wherein a sparkle contrast of the first surface is 4% or less, where the sparkle contrast is measured in conformity with JIS C 1006: 2019. In the optical sheet according to the present disclosure, a haze value may be 40% or more, but not more than 70%.

The optical sheet according to the present disclosure may be such that an arithmetic average roughness Ra of the first surface is 0.6 μm or less, where the arithmetic average roughness Ra is measured in conformity with JIS B 0601: 2001 (with an assessment length of 290 μm), and a peak count RPc of the first surface is 16 or more, where the peak count RPc is measured in conformity with JIS B 0601: 2001 (with an assessment length of 290 μm). With this configuration, the first surface of the optical sheet has unevenness including minute convex portions provided densely and uniformly. Therefore, the use of the optical sheet of the present disclosure as a surface element of various display devices facilitates stable suppression of the sparkle on a display screen.

The optical sheet according to the present disclosure may be such that the arithmetic average roughness Ra is 0.5 μm or less, and the peak count RPc is 18 or more. With this configuration, the first surface of the optical sheet has unevenness including the minute convex portions provided more densely and uniformly. Therefore, the use of the optical sheet of the present disclosure as a surface element of various display devices facilitates further suppression of the sparkle on a display screen. More specifically, the use of the optical sheet of the present disclosure makes it possible to lower the sparkle contrast to about 3% or less.

The optical sheet of the present disclosure may be such that a mean spacing of profile irregularities Sm on the first surface is 20 μm or less, more preferably 15 μm or less, where the mean spacing of profile irregularities Sm is measured according to JIS B 0601: 1994 (with an assessment length of 290 μm). With this configuration, the first surface of the optical sheet has unevenness including the minute convex portions provided further uniformly and densely. Therefore, the use of the optical sheet of the present disclosure as a surface element of various display devices facilitates further suppression of the sparkle on a display screen.

The optical sheet of the present disclosure may include a base layer and a light diffusion layer being provided on the base layer and having the first surface, wherein the unevenness is formed by dispersing resin beads in a resin matrix, which is to become the light diffusion layer. Thus, by a process including uniformly dispersing the resin beads being so minute in particle diameter in the resin matrix, the first surface of the optical sheet can have unevenness including the minute convex portions disposed densely and uniformly. In this case, if a refractive index difference between the resin matrix and the resin beads is 0.05 or less, the influence of light diffusion at the interface between the resin matrix and the resin beads can be suppressed. With such a configuration that, in dispersing the resin beads minute in particle diameter in the resin matrix, resin beads slightly larger in particle diameter (e.g., approximately m in particle diameter) are mixed in by such a small amount that the resin beads slightly larger in particle diameter will not cause the sparkle, the optical sheet of the present disclosure can be improved in non-damage giving property and haze value.

The optical sheet of the present disclosure may be for being provided on a front surface side of a prism sheet in a backlight unit of a liquid crystal display apparatus. By employing the optical sheet of the present disclosure as the overlying light diffusion sheet of the LCD (BLU) as above, the sparkle on the display screen that would be caused by interference between the uneven surface of the overlying light diffusion sheet and the cell array of the liquid crystal panel can be suppressed. Further, the luminance unevenness attributed to the shape of the prism parts of the prism sheet arranged on the back surface side of the overlying light diffusion sheet, or the like can be suppressed.

A backlight unit of the present disclosure includes a light source; and a prism sheet to which light from the light source is introduced; and an optical sheet provided on a light emitting surface side of the prism sheet. The optical sheet is the optical sheet of the present disclosure described above.

With the backlight unit of the present disclosure, the optical sheet of the present disclosure described above is employed as the overlying light diffusion sheet. Therefore, the sparkle on the display screen that would be caused by interference between the uneven surface of the overlying light diffusion sheet and the cell array of the liquid crystal panel can be suppressed. Further, the luminance unevenness attributed to the shape of the prism parts of the prism sheet arranged on the back surface side of the overlying light diffusion sheet, or the like can be suppressed.

A liquid crystal display apparatus of the present disclosure includes the above-described backlight unit of the present disclosure and a liquid crystal display panel.

Since the liquid crystal display apparatus of the present disclosure includes the above-described backlight unit of the present disclosure, the sparkle on the display screen can be suppressed.

An information device of the present disclosure includes the above-described liquid crystal display apparatus of the present disclosure.

Since the information device according to the present disclosure includes the liquid crystal display apparatus of the present disclosure, the sparkle on the display screen can be suppressed.

With the present disclosure, an optical sheet capable of suppressing the sparkle on a display screen can be provided.

DETAILED DESCRIPTION OF VARIOUS EMBODIMENTS

Embodiments

With reference to the drawings, the following describes an optical sheet, a backlight unit, a liquid crystal display apparatus, and an information device of an embodiment of the present disclosure. Note that the scope of the present disclosure is not limited to the embodiment described below, and the embodiment may be modifiable in any way within the scope of the technical concept of the present disclosure. In addition, in the present disclosure, the "front surface side" refers to a viewer side of the liquid crystal display apparatus, and the "back surface side" refers to the opposite side.

<Backlight Unit>

Figure 1:
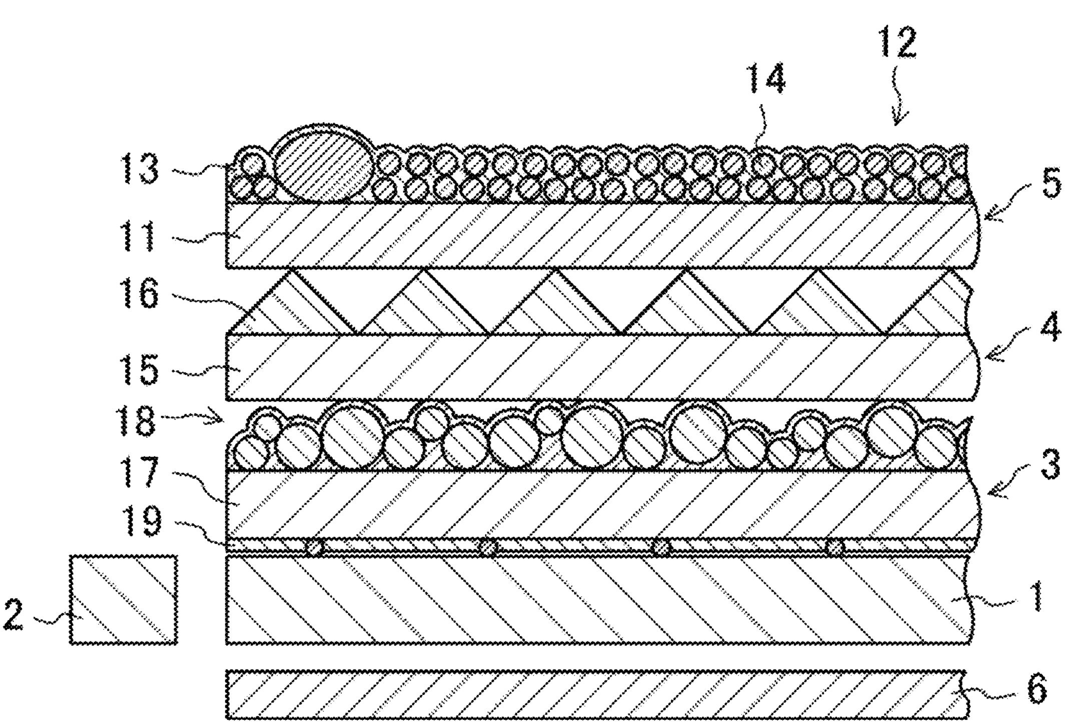
FIG. 1 is a schematic cross-sectional view illustrating a backlight unit according to an embodiment.
Figure 2:
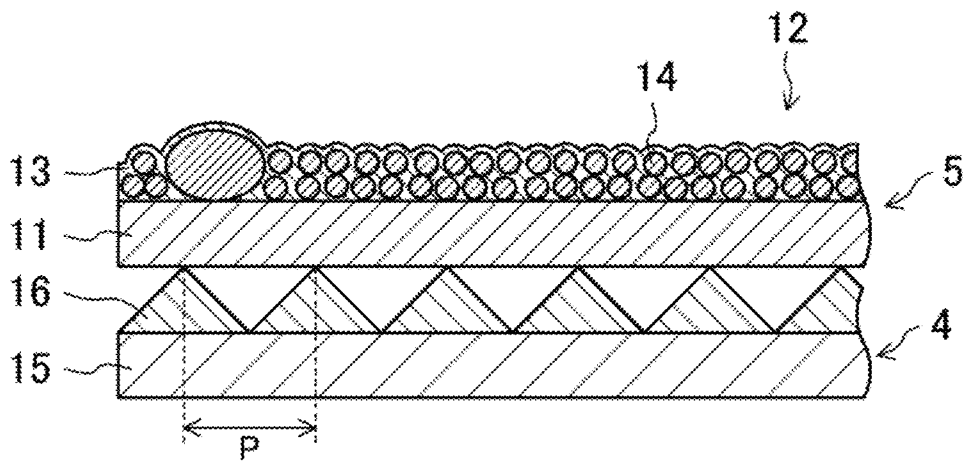
FIG. 2 is a schematic cross-sectional view illustrating a geometry of an overlying light diffusion sheet and a prism sheet of the backlight unit illustrated in FIG. 1.

FIG. 1 is a schematic cross-sectional view illustrating a backlight unit of an embodiment. FIG. 2 is a schematic cross-sectional view illustrating a geometry of an overlying light diffusion sheet and a prism sheet of the backlight unit illustrated in FIG. 1.

The backlight unit of a liquid crystal display apparatus illustrated in FIG. 1 includes a prism sheet 4 and an overlying light diffusion sheet 5 provided on the front surface side of the prism sheet 4. More specifically, the backlight unit illustrated in FIG. 1 is an edge-light type backlight unit, and includes a light guide sheet 1 that guides, to the front surface side, light rays entering therein from an end surface thereof, a light source 2 that emits the light ray to the end surface of the light guide sheet 1, an underlying light diffusion sheet 3 laminated on the front surface side of the light guide sheet 1, a prism sheet 4 provided on the front surface side of the underlying light diffusion sheet 3, an overlying light diffusion sheet 5 laminated on the front surface side of the prism sheet 4, and a reflective sheet 6 provided on the back surface side of the light guide sheet 1.

The underlying light diffusion sheet 3 diffuses the light rays entering therein from the back surface side, in such a way that the diffused light rays are focused in the normal direction (that is, diffuses the light rays to focus). The prism sheet 4 functions to refract, in the normal direction, the light rays entering therein from the back surface side. The overlying light diffusion sheet 5 slightly diffuses light rays entering therein from the back surface side, so as to suppress luminance unevenness attributed to the shape of prism parts of the prism sheet 4, or the like. Here, the overlying light diffusion sheet 5 of the present embodiment suppresses sparkle that would be caused by interference with a cell array of a liquid crystal panel (not illustrated) provided on the front surface side of the overlying light diffusion sheet 5, as will be described later. The reflective sheet 6 reflects, toward the front surface side, the light rays coming out from the back surface side of the light guide sheet 1, thereby causing the light rays to enter the light guide sheet 1 again.

<Overlying Light Diffusion Sheet>

As illustrated in FIGS. 1 and 2, the overlying light diffusion sheet 5 is provided on the front surface side of the prism sheet 4. In the present embodiment, in particular, the overlying light diffusion sheet 5 is directly laminated on the surface of the prism sheet 4 (without interposing another sheet or the like therebetween). The overlying light diffusion sheet 5 includes a base layer 11 and a light diffusion layer 12 laminated on a front surface side of the base layer 11. The overlying light diffusion sheet 5 is constituted as a two-layer structure with the base layer 11 and the light diffusion layer 12.

Because the base layer 11 needs to be transmissive for the light rays, the base layer 11 is formed mainly of a transparent (e.g., colorless and transparent) synthetic resin. The main component of the base layer 11 is not particularly limited, and the main component of the base layer 11 may be polyethylene terephthalate, polyethylene naphthalate, an acrylic resin, polycarbonate, polystyrene, polyolefin, cellulose acetate, weather-resistant vinyl chloride, or the like. The term "main component" refers to a component with the highest content, e.g., 50% or more by mass.

A lower limit of an average thickness of the base layer 11 is preferably approximately 10 μm, more preferably approximately 35 μm, and still more preferably approximately 50 μm. On the other hand, an upper limit of the average thickness of the base layer 11 is preferably approximately 500 μm, more preferably approximately 250 μm, and still more preferably approximately 188 μm. An average thickness of the base layer 11 being less than the lower limit would cause curling in a case where the light diffusion layer 12 is formed by coating. On the other hand, an average thickness of the base layer 11 exceeding the upper limit would cause a drop in the luminance of the liquid crystal display apparatus, and may fail to meet the demand for thinning the liquid crystal display apparatus. The "average thickness" refers to an average value of thicknesses at 10 points selected randomly.

The light diffusion layer 12 constitutes a foremost surface of the overlying light diffusion sheet 5. The light diffusion layer 12 includes a resin matrix 13 and resin beads 14 dispersed in the resin matrix 13. The light diffusion layer 12 contains the resin beads 14 dispersed at substantially uniform density. The resin beads 14 are enclosed in the resin matrix 13. The dispersion of the resin beads 14 in the resin matrix 13 forms unevenness including minute convex portions on the surface of the light diffusion layer 12, and the diffusion layer 12 is able to outwardly scatter light rays with the presence of the unevenness. In this embodiment, a sparkle contrast is 4% or less, where the sparkle contrast is measured in conformity with JIS C 1006: 2019 on the uneven surface of the light diffusion layer 12 (the foremost surface of the overlying light diffusion sheet 5).

A lower limit of the average thickness of the light diffusion layer 12 may be, for example, approximately 1 μm, and more preferably approximately 2 μm. On the other hand, an upper limit of the average thickness of the light diffusion layer 12 may be, for example, approximately 7 μm, more preferably approximately 5 μm, and still more preferably approximately 4 μm. An average thickness of the light diffusion layer 12 below the lower limit would not allow the resin matrix 13 to hold the resin beads 14 surely, which would result in falling-off of the resin beads 14 from the light diffusion layer 12. On the other hand, an average thickness of the light diffusion layer 12 exceeding the upper limit would make it difficult to form unevenness including the minute convex portions with such a high density on the surface of the light diffusion layer 12, consequently leading to a possibility of failing to sufficiently suppress the sparkle caused by interference with the cell array of the liquid crystal panel provided on the front surface side of the overlying light diffusion sheet 5.

Since the light rays need to pass through the resin matrix 13 needs to be transmissive to the light rays, the resin matrix 13 is formed mainly of a/the transparent (especially, colorless and transparent) synthetic resin. As the synthetic resin, for example, a thermosetting resin, an active energy ray-curable resin, or the like can be used. Examples of such a usable thermosetting resin include epoxy resins, silicone resins, phenol resins, urea resins, unsaturated polyester resins, melamine resins, alkyd resins, polyimide resins, acrylic resins, amide-functional copolymers, urethane resins, and the like. As the active energy ray-curable resin, UV curable resins that are cross-linked and cured by UV irradiation and electron beam curable resins that are cross-linked and cured by electron beam irradiation, and the like resins can be used, and the active energy ray-curable resin can be selected from polymerizable monomers and polymerizable oligomers, as needed. In order to improve the adhesion to the base layer 11 and to prevent the resin beads 14 from falling off from the light diffusion layer 12, the active energy ray-curable resin may be, for example, an acrylic-based, urethane-based, or acrylic urethane-based UV curable resin.

The resin matrix 13 may contain an additive in addition to the synthetic resin described above. Examples of such an additive include a silicone-based additive, a fluorine-based additive, an antistatic agent, and the like. The solid content of the additive in the resin matrix 13 relative to 100 parts by mass of the synthetic resin component may be, for example, from 0.05 parts by mass or more, but not more than 5 parts by mass.

The resin beads 14 are resin particles having a property of transmitting and diffusing light rays. The resin beads 14 are formed mainly of a/the transparent, particularly colorless and transparent synthetic resin. Examples of the main component of the resin beads 14 include acrylic resins, acrylonitrile resins, polyurethane, polyvinyl chloride, polystyrene, polyamide, polyacrylonitrile, and the like. The resin beads 14 is not particularly limited in shape, and may be, for example, spherical, cubic, needle-like shaped, rod-like shaped, spindle-like shaped, plate-like shaped, scale-like shapes, fiber-like shaped, or the like, but it is particularly preferable that the resin beads 14 be spherical for an excellent light diffusing property.

It is preferable that, in particle diameter, the resin beads 14 be as small as possible but not smaller than the wavelength of the light rays emitted from the light source 2 (hereinafter, this wavelength may be referred to as a light source wavelength). An upper limit of an average particle diameter of the resin beads 14 may be, for example, approximately 2 μm, and more preferably approximately 1 μm. An average particle diameter of the resin beads 14 smaller than the light source wavelength makes the unevenness on the surface of the light diffusion layer 12 too small. This would result in an insufficient light diffusing property of the light diffusion layer 12 and consequently lead to a possibility of failing to sufficiently suppress the luminance unevenness attributed to the shape of the prism parts of the prism sheet 4, or the like. On the other hand, an average particle diameter of the resin beads 14 exceeding the upper limit forms unevenness with a large number of relatively larger convex portions on the surface of the light diffusion layer 12, which would lead to a possibility of failing to sufficiently suppress the sparkle caused by interference with the cell array of the liquid crystal panel.

A lower limit of the refractive index of the resin beads 14 may be, for example, preferably 1.46 and more preferably 1.48. On the other hand, an upper limit of the refractive index of the resin beads 14 may be, for example, preferably 1.60 and more preferably 1.59. With the refractive index of the resin beads 14 within this range, a refractive index difference between the resin matrix 13 and the resin beads 14 can be within an appropriate range (for example, 0.05 or less). This makes it easy to suppress the luminance unevenness caused by the shape of the ridge-like prism parts of the prism sheet 4, or the like. The "refractive index" refers to a refractive index for light (sodium D-line) having a wavelength of 589.3 nm.

The surface of the light diffusion layer 12 (that is, the surface of the overlying light diffusion sheet 5) may have an arithmetic average roughness Ra, whose lower limit may be, for example, approximately 0.1 μm, more preferably approximately 0.2 μm, and still more preferably approximately 0.3 μm. On the other hand, an upper limit of the arithmetic average roughness Ra of the surface of the light diffusion layer 12 may be, for example, preferably approximately 0.6 μm, and more preferably approximately 0.5 μm. An arithmetic average roughness Ra of the surface of the light diffusion layer 12 below the lower limit indicates that the unevenness on the surface of the light diffusion layer 12 are too small. This would result in an insufficient light diffusing property of the light diffusion layer 12 and consequently lead to a possibility of failing to sufficiently suppress the luminance unevenness attributed to the shape of the ridge-like prism parts of the prism sheet 4, or the like. On the other hand, an arithmetic average roughness Ra of the surface of the light diffusion layer 12 exceeding the upper limit means indicates that unevenness with a large number of relatively larger convex portions is formed on the surface of the light diffusion layer 12, which would lead to a possibility of failing to sufficiently suppress the sparkle caused by interference with the cell array of the liquid crystal panel. The term "arithmetic average roughness Ra" is "an average value of absolute value deviations from an average line", and more specifically, the arithmetic average roughness Ra is worked out in conformity with JIS B 0601: 2001 (ISO 4287: 1997), without a cutoff, and with an assessment length of 290 μm.

The surface of the light diffusion layer 12 (that is, the surface of the overlying light diffusion sheet 5) may have a peak count RPc, whose lower limit may be, for example, approximately 10, more preferably approximately 16, and still more preferably approximately 18. On the other hand, an upper limit of the peak count RPc of the surface of the light diffusion layer 12 may be, for example, preferably approximately 300, more preferably approximately 250, and still more preferably 200. A peak count RPc of the surface of the light diffusion layer 12 below the lower limit indicates that unevenness with a large number of relatively larger convex portions are formed on the surface of the light diffusion layer 12, which would lead to a possibility of failing to sufficiently suppress the sparkle caused by interference with the cell array of the liquid crystal panel. A peak count RPc of the surface of the light diffusion layer 12 exceeding the upper limit indicates that the unevenness on the surface of the light diffusion layer 12 are too small. This may lead to an insufficient light diffusing property of the light diffusion layer 12 and consequently lead to a possibility of failing to sufficiently suppress the luminance unevenness attributed to the shape of the ridge-like prism parts of the prism sheet 4, or the like. The "peak count RPc" refers to "the number of the peaks per the assessment length", and more specifically the peak count RPc is the number of peaks (peak count 2) worked out in conformity with JIS B 0601: 2001 (ISO 4287: 1997) with the assessment length of 290 μm and with dead bandwidths on both sides of the average line being set to 0%, where a profile counted as a peak (mountain) for the peak count 2 is a profile rising from a point just below the average line to go above the average line, and going below the average line again.

A lower limit of a mean spacing of profile irregularities Sm of the surface of the light diffusion layer 12 (i.e., the surface of the overlying light diffusion sheet 5) may be, for example, approximately 0.5 μm, more preferably approximately 1.0 μm, and more preferably approximately 1.5 μm. On the other hand, an upper limit of the mean spacing of profile irregularities Sm of the surface of the light diffusion layer 12 may be, for example, preferably approximately 25 μm, more preferably approximately 20 μm, and still more preferably 15 μm. A mean spacing of profile irregularities Sm on the surface of the light diffusion layer 12 below the lower limit indicates that the unevenness on the surface of the light diffusion layer 12 are too small. This would result in an insufficient light diffusing property of the light diffusion layer 12 and consequently lead to a possibility of failing to sufficiently suppress the luminance unevenness attributed to the shape of the ridge-like prism parts of the prism sheet 4, or the like. On the other hand, a mean spacing of profile irregularities Sm of the light diffusion layer 12 exceeding the upper limit indicates that it is difficult to form such unevenness including the minute convex portions with such a high density on the surface of the light diffusion layer 12, which would consequently lead to a possibility of failing to sufficiently suppress the sparkle caused by interference with the cell array of the liquid crystal panel. The term "mean spacing of profile irregularities Sm" is "an arithmetic average value of spacings of irregularities (where each spacing is a distance consisting of a profile peak and a valley adjacent thereto) over the assessment length", and more specifically, the mean spacing of profile irregularities Sm is worked out in conformity with JIS B 0601: 1994 (ISO 468-1982, ISO 3274-1975, ISO 4287/1-1984, ISO 4287/2-1984, ISO 4288/1985), without a cutoff, and with an assessment length of 290 μm.

A lower limit of a layer amount (based on the solid content) of the light diffusion layer 12 may be, for example, 1 $g/m^2$, or more preferably 2 $g/m^2$. On the other hand, an upper limit of the layer amount of the light diffusion layer 12 may be, for example, 15 $g/m^2$, or more preferably 10 $g/m^2$. A layer amount of the light diffusion layer 12 below the lower limit would not allow the resin matrix 13 to hold the resin beads 14 surely, which would result in falling-off of the resin beads 14 from the light diffusion layer 12. On the other hand, a layer amount of the light diffusion layer 12 exceeding the upper limit would make it difficult to form the unevenness including the minute convex portions with such a high density on the surface of the light diffusion layer 12, consequently leading to a possibility of failing to sufficiently suppress the sparkle caused by interference with the cell array of the liquid crystal panel provided on the front surface side of the overlying light diffusion sheet 5.

A lower limit of the content of the resin matrix 13 in the light diffusion layer 12 may be, for example, approximately 10% by mass, and more preferably about 20% by mass. On the other hand, an upper limit of the content of the resin matrix 13 in the light diffusion layer 12 may be, for example, about 80% by mass, or more preferably about 75% by mass. If the content of the resin matrix 13 is below the lower limit, the light diffusing property of the light diffusion layer 12 would become too high, so that the luminance of the liquid crystal display apparatus would not be sufficiently high. On the other hand, if the content of the resin matrix 13 exceeds the upper limit, the number of the resin beads 14 in the light diffusion layer 12 would be insufficient, which would make it difficult to form the unevenness including the minute convex portions with such a high density on the surface of the light diffusion layer 12, consequently leading to a possibility of failing to sufficiently suppress the sparkle caused by interference with the cell array of the liquid crystal panel provided on the front surface side of the overlying light diffusion sheet 5.

A lower limit of the content of the resin beads 14 in the light diffusion layer 12 may be, for example, approximately 20% by mass, or more preferably approximately 25% by mass. On the other hand, an upper limit of the content of the resin beads 14 in the light diffusion layer 12 may be, for example, approximately 90% by mass, or more preferably approximately 80% by mass. If the content of the resin beads 14 in the light diffusion layer 12 is below the lower limit, it would become difficult to form unevenness including the minute convex portions with such a high density on the surface of the light diffusion layer 12, consequently leading to a possibility of failing to sufficiently suppress the sparkle caused by interference with the cell array of the liquid crystal panel provided on the front surface side of the overlying light diffusion sheet 5. On the other hand, if the content of the resin beads 14 in the light diffusion layer 12 exceeds the upper limit, the light diffusing property of the light diffusion layer 12 would become too high, so that the luminance of the liquid crystal display apparatus would not be sufficiently high.

A lower limit of a haze value of the overlying light diffusion sheet 5 may be, for example, approximately 10%, more preferably approximately 30%, and still more preferably approximately 40%. On the other hand, an upper limit of the haze value of the overlying light diffusion sheet 5 may be, for example, approximately 90%, and more preferably approximately 70%. A haze value of the overlying light diffusion sheet 5 below the lower limit would lead to a possibility of failing to sufficiently suppress the luminance unevenness attributed to the shape of the ridge-like prism parts of the prism sheet 4, or the like. On the other hand, a haze value of the overlying light diffusion sheet 5 exceeding the upper limit would result in insufficient luminance of the liquid crystal display apparatus. The "haze value" refers to a value measured in conformity with JIS K 7136: 2000.

<Manufacturing Method of Overlying Light Diffusion Sheet>

The manufacturing method of the overlying light diffusion sheet 5 is not particularly limited, but may include, for example, a step of forming a sheet member constituting the base layer 11 (hereinafter, base layer formation step) and a step of laminating a light diffusion layer 12 on one side of this sheet member (hereinafter, light diffusion layer laminating step).

Examples of the base layer formation step adoptable include, but not limited to, a method of extruding a molten thermoplastic resin from a T-die, and then stretching the extrudate in the length and width directions to form a sheet member. Examples of an adoptable well-known extrusion method using a T-die include a polishing roll method and a chill roll method. Examples of an adoptable method for stretching the sheet member include a tubular film biaxial stretching method, a flat film biaxial stretching method, and the like.

The light diffusion layer laminating step may include, for example, a step of preparing a coating liquid containing a resin matrix 13 and resin beads 14 (hereinafter, preparation step), a step of applying the coating liquid prepared in the preparation step to one side of the sheet member (hereinafter, coating step), and a step of drying and curing the coating liquid applied in the coating step (hereinafter, curing step). The preparation step may prepare the coating liquid that contains an active energy ray-curable resin as the main component of the resin matrix 13 and contains the resin beads 14. In a case of using an active energy ray-curable resin as the main component of the resin matrix 13 in the manufacturing method of the overlying light diffusion sheet, the active energy ray-curable resin is cured in a relatively shorter time with irradiation of, for example, UV rays in the curing step after the coating liquid is applied in the coating step. Further, by arranging the preparation step of the manufacturing method of the overlying light diffusion sheet such that the preparation step prepares a coating liquid containing, as the resin beads 14, a large number of resin beads small in particle diameter and a smaller amount of resin beads large in particle diameter, it is possible to attain an overlying light diffusion sheet in which the resin beads large in particle diameter keeps the overlying light diffusion sheet from sticking to the liquid crystal panel, while the resin beads small in particle diameter suppress the sparkle attributed to the interference with the cell array of the liquid crystal panel.

The manufacturing method for the overlying light diffusion sheet 5 may further include, prior to the light diffusion layer laminating step, a surface treatment step of applying a surface treatment to that side of the sheet member on which the light diffusion layer will be laminated, where the surface treatment may be applying a corona discharge treatment, an ozone treatment, a low-temperature plasma treatment, a glow discharge treatment, an oxidation treatment, a primer coating treatment, an undercoating treatment, an anchor coating treatment, and/or the like.

<Prism Sheet>

Since the prism sheet 4 needs to be transmissive for the light rays, the prism sheet 4 is formed mainly of a/the transparent (e.g., colorless and transparent) synthetic resin. The prism sheet 4 includes a base layer 15 and a protrusion array including a plurality of ridge-like prism parts 16 provided on the surface of the base layer 15. The ridge-like prism parts 16 are provided in a stripe pattern on the surface of the base layer 15. The ridge-like prism parts 16 are triangular prisms whose back surfaces are in contact with the surface of the base layer 15.

A lower limit of the thickness of the prism sheet 4 (the height from the back surface of the base layer 15 to the vertices of the ridge-like prism parts 16) may be, for example, preferably approximately 50 μm, and more preferably approximately 100 μm. On the other hand, an upper limit of the thickness of the prism sheet 4 may be, for example, approximately 200 μm, and more preferably approximately 180 μm. A lower limit of the pitch p of the ridge-like prism parts 16 (see FIG. 2) in the prism sheet 4 may be, for example, approximately 20 μm, and more preferably approximately 30 μm. On the other hand, the upper limit of the pitches p of the ridge-like prism parts 16 in the prism sheet 4 may be, for example, approximately 100 μm, and more preferably approximately 60 μm. The vertex angles of the ridge-like prism parts 16 may be, for example, not less than 85° but not more than 95°. A lower limit of a refractive index of the ridge-like prism parts 16 may be, for example, 1.5, or more preferably 1.55. On the other hand, an upper limit of the refractive index of the ridge-like prism parts 16 may be 1.7, for example.

Note that the backlight unit of the present embodiment illustrated in FIG. 1 is not limited to a backlight unit having only one prism sheet 4 and may further include other prism sheets superimposed on the prism sheet 4. In this case, the ridges of the plurality of ridge-like prism parts 16 of the prism sheet 4 are orthogonal to the ridges of the plurality of prism parts of the other prism sheet, in a preferred embodiment. This way, light rays incident on the underlying light diffusion sheet 3 can be refracted in the normal direction by one prism sheet, and light rays emitted from that prism sheet can be further refracted by another prism sheet in a direction substantially perpendicular to the back surface of the overlying light diffusion sheet 5. The material and thickness of the other prism sheet, the pitch of the ridge-like prism parts, the vertex angle of the prism parts, and the refractive index of the prism parts may be the same as those of the prism sheet 4.

<Light Guide Sheet>

The light guide sheet 1 is a sheet-like optical member that allows the light rays emitted from the light source 2 to propagate therein and exit from the surface thereof. The light guide sheet 1 may have a substantially wedge-shaped cross-section, or may have a substantially flat plate-like shape. Since the light guide sheet 1 needs to be light-transmissive, the light guide sheet 1 is formed mainly of a/the transparent (e.g., colorless and transparent) resin. The main component of the light guide sheet 1 is not particularly limited, and may be polycarbonate, which is excellent in transparency, strength, and the like, or a synthetic resin such as an acrylic resin, which is excellent in transparency, abrasion resistance, and the like. Since polycarbonate is excellent in transparency and has a high refractive index, a light guide sheet 1 whose main component is polycarbonate makes it easier to cause total reflection at an interface with an air layer (a layer formed in a gap between the light guide sheet 1 and the underlying light diffusion sheet 3 and a layer formed in a gap between the light guide sheet 1 and the reflective sheet 6), thereby attaining an efficient propagation of the light rays. Further, since polycarbonate is heat resistant, deterioration or the like due to heat generated in the light source 2 hardly occurs.

<Light Source>

The light source 2 is provided with its emission surface facing (or abutting) against an end surface of the light guide sheet 1. As the light source 2, various light sources can be adopted, and, for example, a light emitting diode (LED) can be employed. More specifically, the light source 2 may be one including a plurality of LEDs arranged along an end surface of the light guide sheet 1.

<Underlying Light Diffusion Sheet>

The underlying light diffusion sheet 3 includes a base layer 17, a light diffusion layer 18 provided on the front surface side of the base layer 17, and an anti-sticking layer 19 provided on the back surface side of the base layer 17. The base layer 17 of the underlying light diffusion sheet 3 may have the same configuration as that of the base layer 11 of the overlying light diffusion sheet 5. The light diffusion layer 18 of the underlying light diffusion sheet 3 includes a light diffusion agent and a binder therefor. The light diffusion agent includes particles with a property of diffusing light rays, and is roughly classified into inorganic fillers and organic fillers. Examples of the inorganic fillers include silica, aluminum hydroxide, aluminum oxide, zinc oxide, barium sulfide, magnesium silicate, and mixtures thereof. Examples of organic fillers include acrylic resins, acrylonitrile resins, polyurethane, polyvinyl chloride, polystyrene, polyamide, polyacrylonitrile, and the like. The light diffusion agent is not particularly limited in shape, and may be, for example, spherical, cubic, needle-like shaped, rod-like shaped, spindle-like shaped, plate-like shaped, scale-like shapes, fiber-like shaped, or the like, but it is preferable that the light diffusion agent be spherical for an excellent light diffusing property.

A lower limit of an average particle diameter of the light diffusion agent employed in the light diffusion layer 18 may be, for example, approximately 8 μm, and more preferably approximately 10 μm. On the other hand, the upper limit of the average particle diameter of the light diffusion agent may be, for example, approximately 50 μm, more preferably approximately 20 μm, and still more preferably approximately 15 μm. An average particle diameter of the light diffusion agent below the lower limit would indicate that the unevenness on the surface of the light diffusion layer 18 are too small and would fail to attain the light diffusing characteristic that is required for the underlying light diffusion sheet 3. On the other hand, an average particle diameter of the light diffusion agent exceeding the upper limit would increase the thickness of the underlying light diffusion sheet 3 and would make it difficult to attain a uniform diffusion.

A lower limit of the content of the binder in the light diffusion layer 18 would be, for example, approximately 15% by mass, and more preferably approximately 30% by mass. On the other hand, an upper limit of the content of the binder in the light diffusion layer 18 may be, for example, approximately 48% by mass, and more preferably approximately 45% by mass. If the content of the binder is below the lower limit, this would not allow the binder to surely hold the light diffusion agent. On the other hand, if the content of the binder exceeds the upper limit, this would result in an insufficient light diffusing property of the light diffusion layer 18.

A lower limit of the content of the light diffusion agent in the light diffusion layer 18 may be, for example, approximately 52% by mass, and more preferably approximately 55% by mass. On the other hand, an upper limit of the content of the light diffusion agent in the light diffusion layer 18 may be, for example, approximately 85% by mass, and more preferably approximately 70% by mass. If the content of the light diffusion agent is below the lower limit, this would result in an insufficient light diffusing property of the light diffusion layer 18. On the other hand, if the content of the light diffusion agent exceeds the upper limit, this would not allow the binder to surely hold the light diffusion agent.

A lower limit of the arithmetic average roughness Ra of the surface of the light diffusion layer 18 may be, for example, approximately 1.1 μm, more preferably approximately 1.3 μm, and still more preferably approximately 1.4 μm. On the other hand, an upper limit of the arithmetic average roughness Ra of the surface of the light diffusion layer 18 may be, for example, approximately 5 μm, more preferably approximately 3 μm, and still more preferably approximately 2 μm. An arithmetic average roughness Ra of the surface of the light diffusion layer 18 below the lower limit would result in an insufficient light diffusing property of the light diffusion layer 18. On the contrary, an arithmetic average roughness Ra of the surface of the light diffusion layer 18 exceeding the upper limit would lower the light transmittance of the light diffusion layer 18, thereby causing insufficient luminance of the liquid crystal display apparatus.

The anti-sticking layer 19 is constituted by dispersion of the resin beads in the resin matrix. These resin beads are provided dispersedly on the back surface side of the base layer 17. With the resin beads thus provided dispersedly, the anti-sticking layer 19 has a plurality of convex portions formed due to the resin beads and a flat portion having no resin beads. The anti-sticking layer 19 contacts the light guide sheet 1 provided on the back surface side in such a way that the anti-sticking layer 19 contacts with the light guide sheet 1 at disseminated points via the plurality of convex portions, instead of having the entire back surface of the anti-sticking layer 19 abuts the light guide sheet 1, thereby preventing sticking so as to suppress the luminance unevenness of the liquid crystal display apparatus.

A lower limit of a haze value of the underlying light diffusion sheet 3 may be, for example, approximately 80%, more preferably approximately 85%, and still more preferably approximately 90%. The haze value of the underlying light diffusion sheet 3 below the lower limit would result in an insufficient light diffusing property of the underlying light diffusion sheet 3. Note that the upper limit of the haze value of the underlying light diffusion sheet 3 would be, for example, approximately 95%.

<Reflective Sheet>

A reflective sheet 6 may be, for example, a white sheet containing fillers dispersed in a base resin such as polyester, or a mirror-surfaced sheet with its specular reflection characteristics enhanced by depositing a metal such as aluminum, silver, or the like on a surface of a film made of polyester, or the like.

Effects of Embodiment

In the above-described embodiment, the sparkle contrast of the surface of the overlying light diffusion sheet 5 (light diffusion layer 12) having unevenness is 4% or less, where the sparkle contrast is measured in conformity with JIS C 1006: 2019. Here, in the unevenness of the light diffusion layer 12, the arithmetic average roughness Ra and the peak count RPc are 0.6 μm or less and 16 or more, respectively, where the arithmetic average roughness Ra and the peak count RPc are measured in conformity with JIS B 0601: 2001 (with the assessment length set to 290 μm). That is, the surface of the overlying light diffusion sheet 5 has unevenness including the minute convex portions provided uniformly and densely. Therefore, the sparkle on the display screen caused by interference between the uneven surface of the overlying light diffusion sheet 5 and the cell array of the liquid crystal panel can be suppressed.

Figure 3:
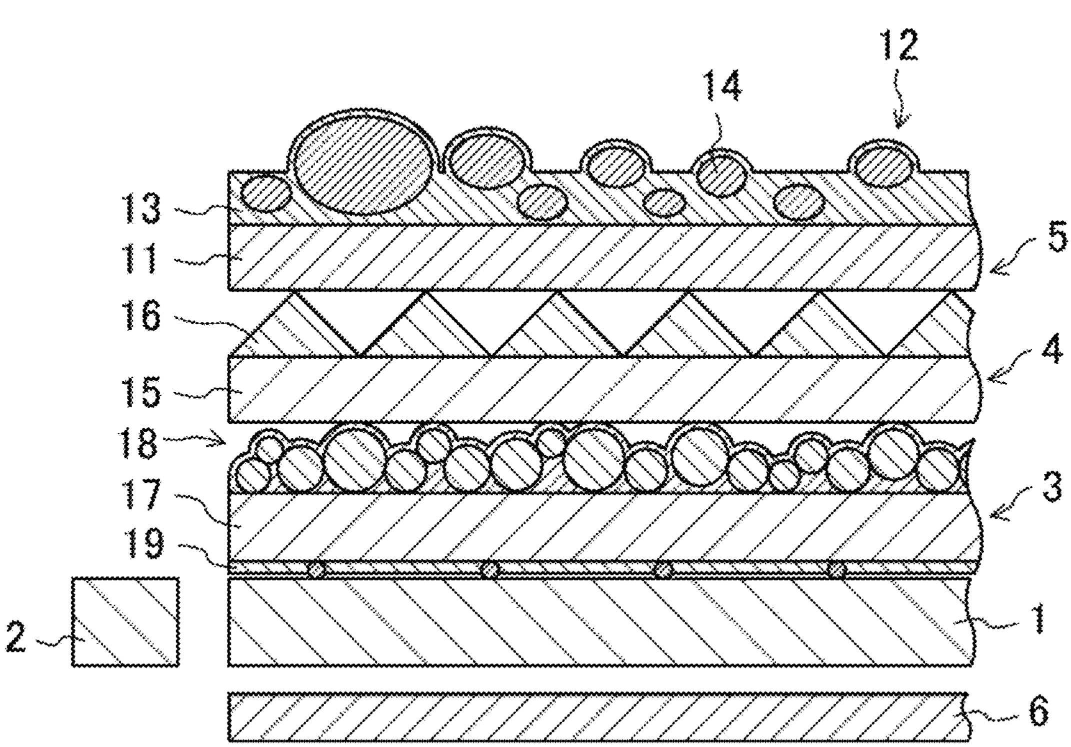
FIG. 3 is a schematic cross-sectional view illustrating a backlight unit of comparative example.

On the contrary, in a case where, as in the backlight unit according to a comparative example shown in FIG. 3, the overlying light diffusion sheet 5 does not have an uneven surface with such unevenness including the minute convex portions densely and uniformly, the sparkle on the display screen caused by interference between the uneven surface of the overlying light diffusion sheet 5 and the cell array of the liquid crystal panel cannot be sufficiently suppressed.

Further, if the surface of the overlying light diffusion sheet 5 of the present embodiment is such that the arithmetic average roughness Ra and the peak count RPc are 0.5 m or less and 18 or more, respectively, this means that the surface of the overlying light diffusion sheet 5 has unevenness in which the minute convex portions are further densely and uniformly present on the surface. Such a configuration facilitates such an effect that the sparkle on the display screen caused by interference between the uneven surface of the overlying light diffusion sheet 5 and the cell array of the liquid crystal panel can be further suppressed. More specifically, this configuration facilitates such an effect that the sparkle contrast can be suppressed to about 3% or less.

Further, if the surface of the overlying light diffusion sheet 5 of the present embodiment is such that the mean spacing of profile irregularities Sm measured in conformity with JIS B 0601: 1994 (with the assessment length of 290 μm) is 20 μm or less, or more preferably 15 μm or less, this means that the surface of the overlying light diffusion sheet 5 has unevenness in which the minute convex portions are further densely and uniformly provided. Such a configuration facilitates such an effect that the sparkle on the display screen caused by interference between the uneven surface of the overlying light diffusion sheet 5 and the cell array of the liquid crystal panel can be further suppressed.

Further, the overlying light diffusion sheet 5 of the present embodiment includes the base layer 11 and the light diffusion layer 12 provided on the base layer 11, and is configured such that the unevenness are formed by dispersion of the resin beads 14 in the resin matrix 13, which constitutes the light diffusion layer 12. Therefore, as a result of uniformly dispersing the resin beads 14 minute in particle diameter in the resin matrix 13, the surface of the overlying light diffusion sheet 5 (light diffusion layer 12) can attain unevenness including the minute convex portions provided densely and uniformly. In this case, if the refractive index difference between the resin matrix 13 and the resin beads 14 is 0.05 or less, the influence of light diffusion at the interface between the resin matrix 13 and the resin beads 14 can be suppressed. With such a configuration that, in dispersing the resin beads 14 minute in particle diameter in the resin matrix 13, resin beads 14 slightly larger in particle diameter (e.g., approximately 5 μm in particle diameter) are mixed in by such a small amount that the resin beads 14 slightly larger in particle diameter will not cause the sparkle, the overlying light diffusion sheet 5 can be improved in non-damage giving property and haze value.

Further, in the backlight unit of the present embodiment illustrated in FIG. 1, the overlying light diffusion sheet 5 is provided on the light emitting surface of the prism sheet 4. In other words, the prism sheet 4 is provided on the back surface side of the overlying light diffusion sheet 5. Therefore, the luminance unevenness attributed to the shape of the prism parts 16 of the prism sheet 4, or the like can be suppressed by the overlying light diffusion sheet 5.

<Modification of Overlying Light Diffusion Sheet>

Figure 4:
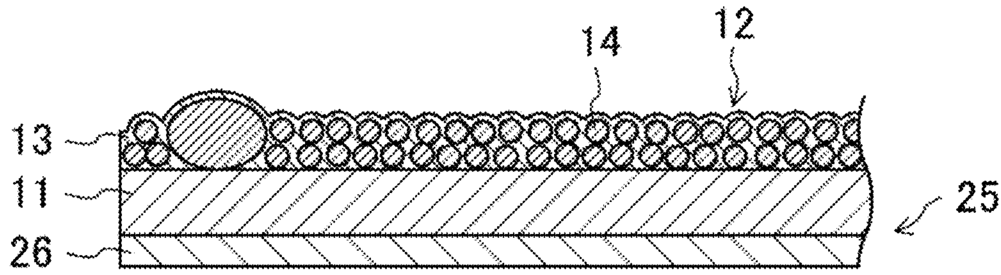
FIG. 4 is a schematic cross-sectional view illustrating an overlying light diffusion sheet of a modification.

Instead of the overlying light diffusion sheet 5 of the foregoing embodiment, an overlying light diffusion sheet 25 of the present modification shown in FIG. 4 may apply to the backlight unit shown in FIG. 1. The overlying light diffusion sheet 25 slightly diffuses light rays incident on its back surface side to suppress luminance unevenness attributed to the shape of the ridge-like prism parts 16 of the prism sheet 4, or the like, and suppress the sparkle attributed to interference with cell array of a liquid crystal panel (not illustrated) provided on the front surface side of the overlying light diffusion sheet 25. The overlying light diffusion sheet 25 includes a base layer 11, a light diffusion layer 12 provided on the front surface side of the base layer 11, and an anti-sticking layer 26 provided on the back surface side of the base layer 11. The overlying light diffusion sheet 25 is configured as a three-layer structure with the base layer 11, the light diffusion layer 12, and the anti-sticking layer 26. The base layer 11 and the light diffusion layer 12 of the overlying light diffusion sheet 25 may have the same configurations as those of the base layer 11 and the light diffusion layer 12 of the overlying light diffusion sheet 5 of the foregoing embodiment, respectively.

The anti-sticking layer 26 constitutes the backmost surface of the overlying light diffusion sheet 25. Since the anti-sticking layer 26 needs to be transmissive for the light rays, the anti-sticking layer 26 is formed mainly of a/the transparent (e.g., colorless and transparent) synthetic resin. The anti-sticking layer 26 is made as a film with a flat back surface and a substantially uniform thickness. The anti-sticking layer 26 is configured to partially contact the vertices of the ridge-like prism parts 16 of the prism sheet 4 provided on the back surface side of the overlying light diffusion sheet 25, thereby facilitating prevention of sticking with the prism sheet 4. The main component of the anti-sticking layer 26 is not particularly limited. But examples of the main component include polycarbonate, acrylic resins, polyethylene terephthalate, polyethylene naphthalate, polystyrene, methyl (meth)acrylate-styrene copolymer, polyolefin, cyclo-olefin polymers, cyclo-olefin copolymers, cellulose acetate, weather-resistant vinyl chloride, active energy ray-curable resins, and the like. In particular, using an acrylic resin as the main component of the anti-sticking layer 26 increases the strength of the back surface of the overlying light diffusion sheet 25 and facilitates prevention of damages on the back surface.

A lower limit of the average thickness of the anti-sticking layer 26 may be, for example, approximately 1 μm, and more preferably approximately 2 μm. On the other hand, an upper limit of the average thickness of the anti-sticking layer 26 may be, for example, approximately m, and more preferably approximately 8 μm. If the average thickness of the anti-sticking layer 26 is below the lower limit, this would not ensure the prevention of damages on the back surface of the overlying light diffusion sheet 25. On the other hand, if the average thickness of the anti-sticking layer 26 exceeds the upper limit, this would lower the luminance of the liquid crystal display apparatus.

An upper limit of the arithmetic average roughness Ra of the back surface of the anti-sticking layer 26 may be, for example, approximately 0.04 μm, more preferably approximately 0.035 μm, and still more preferably approximately 0.03 μm. If the arithmetic average roughness Ra of the back surface of the anti-sticking layer 26 exceeds the upper limit, the anti-sticking layer 26 would cause damage on the prism parts 16 of the prism sheet 4 when the ridge-like prism parts 16 abuts against the anti-sticking layer 26. A lower limit of the arithmetic average roughness Ra of the back surface of the anti-sticking layer 26 is not particularly specified; however, may be 0.01 μm, for example.

A manufacturing method of the overlying light diffusion sheet 25 may include, for example, a step of forming a sheet member constituting the base layer 11 (hereinafter, base layer formation step), a step of laminating a light diffusion layer 12 on one side of this sheet member (hereinafter, light diffusion layer laminating step), and a step of laminating an anti-sticking layer 26 on another side of the sheet member constituting the base layer 11 (hereinafter, anti-sticking layer laminating step). The anti-sticking layer laminating step may be, for example, forming the anti-sticking layer 26 and the sheet member constituting the base layer 11 at the same time by co-extrusion, laminating the anti-sticking layer 26 on the other side of the sheet member by coating, or the like process.

The base layer formation step in the manufacturing method of the overlying light diffusion sheet 25 may be carried out simultaneously with the anti-sticking layer layering step by the co-extrusion, as described above, or separately from the anti-sticking layer layering step. In a case of separately performing the base layer formation step and the anti-sticking layer formation step, the base layer formation step may be performed in a similar manner to the base layer formation step of the overlying light diffusion sheet 5 in the foregoing embodiment. Further, the light diffusion layer laminating step in the manufacturing method of the overlying light diffusion sheet 25 may also be performed in a similar manner as the light diffusion layer laminating step of the overlying light diffusion sheet 5 of the foregoing embodiment.

The overlying light diffusion sheet 25 of the present modification described hereinabove brings about the following effect in addition to the effects similar to those achieved by the overlying light diffusion sheet 5 of the foregoing embodiment. Namely, since the anti-sticking layer 26 is provided on the back surface side of the base layer 11, the anti-sticking property against the prism sheet 4 and the damage resistance of the overlying light diffusion sheet 25 can be improved while the luminance unevenness attributed to the shape of the ridge-like prism parts 16 of the prism sheet 4, or the like is suppressed.

<Liquid Crystal Display Apparatus>

Figure 5:
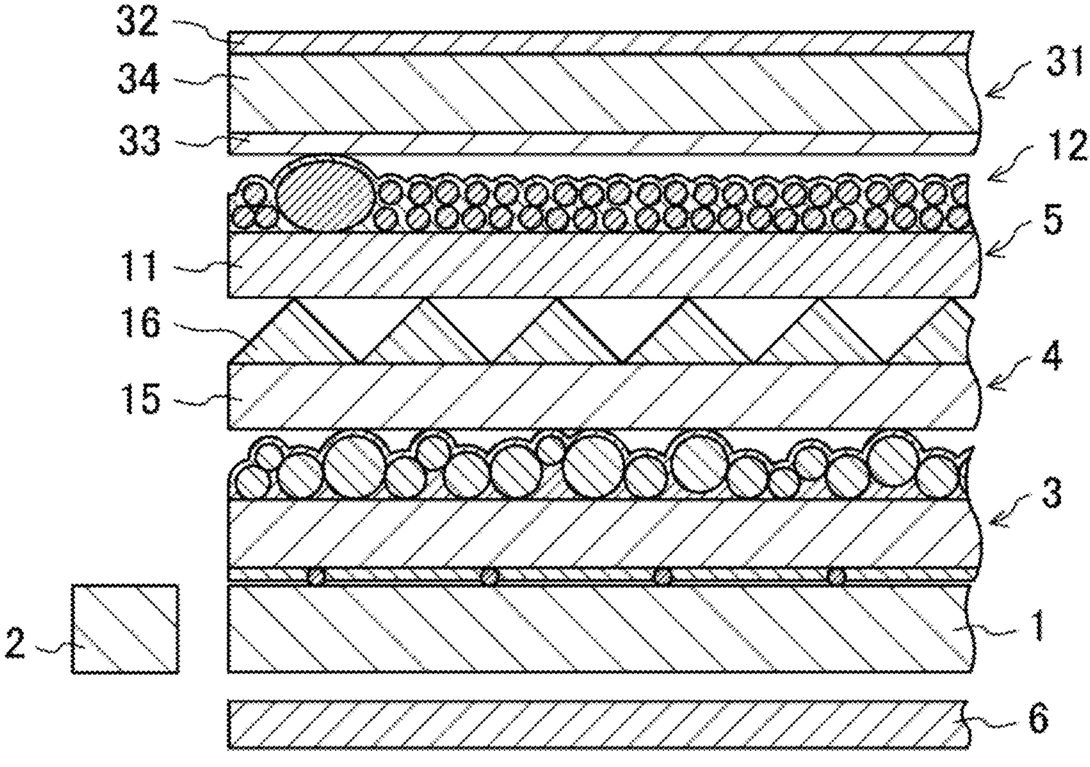
FIG. 5 is a schematic cross-sectional view illustrating a liquid crystal display apparatus including the backlight unit illustrated in FIG. 1.

A liquid crystal display apparatus illustrated in FIG. 5 includes a light guide sheet 1 that guides, to a front surface side, light rays entering therein from an end surface thereof, a light source 2 that emits the light rays to the end surface of the light guide sheet 1, an underlying light diffusion sheet 3 laminated on the front surface side of the light guide sheet 1, a prism sheet 4 provided on the front surface side of the underlying light diffusion sheet 3, an overlying light diffusion sheet 5 laminated on the front surface side of the prism sheet 4, a reflective sheet 6 provided on the back surface side of the light guide sheet 1, and a liquid crystal panel 31 laminated on the front surface side of the overlying light diffusion sheet 5. That is, the liquid crystal display apparatus of FIG. 5 has a configuration having the liquid crystal panel 31 provided on the front surface side of the overlying light diffusion sheet 5 of the backlight unit of the foregoing embodiment shown in FIG. 1.

The liquid crystal panel 31 is provided directly on the surface of the overlying light diffusion sheet 5 (without interposing another sheet or the like). The liquid crystal panel 31 has a front surface side polarizing plate 32 and a back surface side polarizing plate 33 arranged substantially parallel to each other and a predetermined distance therebetween, and a liquid crystal cell 34 arranged therebetween. The front surface side polarizing plate 32 and the back surface side polarizing plate 33 each include, for example, a polarizer such as an iodine-based polarizer, a dye-based polarizer, or a polyene-based polarizer, and a pair of transparent protective films disposed on both sides of the polarizer. Transmission axes of the front surface side polarizing plate 32 and the back surface side polarizing plate 33 are orthogonal to each other.

The liquid crystal cell 34 has a function of controlling the amount of light transmitting therethrough, and various known types of liquid crystal cells are adoptable. The liquid crystal cell 34 is generally a lamination structure including a substrate, a color filter, a counter electrode, a liquid crystal layer, pixel electrodes, a substrate, and the like. The pixel electrodes may be a transparent conductive film such as ITO. Examples of a display mode of the liquid crystal cell 34 include TN (Twisted Nematic), VA (Vertical Alignment), IPS (In-Place Switching), FLC (Ferroelectric Liquid Crystal), AFLC (Anti-ferroelectric Liquid Crystal), OCB (Optically Compensatory Bend), STN (Super Twisted Nematic), HAN (Hybrid Aligned Nematic), and the like. The pixel pitch of the liquid crystal panel 31 (pixel pitch of a liquid crystal cell) may be, for example, approximately 25 μm or less.

The liquid crystal display apparatus illustrated in FIG. 5 includes the overlying light diffusion sheet 5 of the foregoing embodiment, and therefore is capable of suppressing the luminance unevenness attributed to the shape of the ridge-like prism parts 16 of the prism sheet 4, or the like. Further, since the overlying light diffusion sheet 5 is provided on the back surface side of the liquid crystal panel 31, the sparkle attributed to interference between the unevenness formed on the surface of the light diffusion layer 12 on the overlying light diffusion sheet 5 and the cell array on the liquid crystal panel 31 can be suppressed.

Use of the liquid crystal display apparatus illustrated in FIG. 5 as a display device for various information devices such as smartphones and tablet terminals facilitates suppression of the sparkle on the display screens of the various information devices.

EXAMPLES

The following further details the present disclosure with reference to examples; however, the present disclosure is not limited to these examples.

Example 1

Figure 6:
FIG. 6 is a microscopic photograph of magnifying a surface of the overlying light diffusion sheet of Example 1 by 1000 times magnification.

An optical sheet (overlying light diffusion sheet) of Example 1 was prepared by laminating a light diffusion layer on a surface of a base layer, the light diffusion layer being such that resin beads were dispersed in a resin matrix whose main component was a UV curable resin, and the base layer containing polyethylene terephthalate as its main component and having an average thickness of 75 μm. The resin beads included a mixture of first beads and second beads. The first beads had a large average particle diameter (average particle diameter of 5 μm) and the second beads had an average particle diameter (average particle diameter of 0.8 μm) smaller than the first beads. The mixture contained the first beads and the second beads at a ratio of 1:55 (mass ratio). A layer amount of the light diffusion layer was 3.5 $g/m^2$, a content of the resin matrix in the light diffusion layer was 31.17% by mass, and an average thickness of the light diffusion layer was 3.5 μm. FIG. 6 is a microscopic photograph of magnifying the surface of the overlying light diffusion sheet of Example 1 by 1000 times.

Example 2

Figure 7:
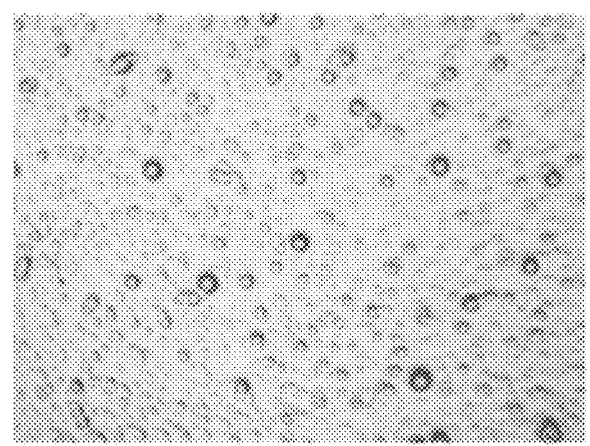
FIG. 7 is a microscopic photograph of magnifying a surface of the overlying light diffusion sheet of Example 2 by 1000 times magnification.

An optical sheet (overlying light diffusion sheet) of Example 2 was prepared by laminating a light diffusion layer on a surface of a base layer, the light diffusion layer being such that resin beads were dispersed in a resin matrix whose main component was a thermosetting resin, and the base layer containing polyethylene terephthalate as its main component and having an average thickness of 125 μm. The resin beads included a mixture of first beads, second beads, and third beads. The first beads had a large average particle diameter (average particle diameter of 5 μm). The second beads had an average particle diameter (average particle diameter of 2 μm) smaller than the first beads. The third beads had an average particle diameter (average particle diameter of 3 μm) smaller than that of the first beads, but larger than that of the second beads. The mixture contained the first beads, the second beads, and the third beads at a ratio of 2:2:1 (mass ratio). A layer amount of the light diffusion layer was 3.5 $g/m^2$, a content of the resin matrix in the light diffusion layer was 51.93% by mass, and an average thickness of the light diffusion layer was 3.5 μm. FIG. 7 is a microscopic photograph of magnifying the surface of the overlying light diffusion sheet of Example 2 by 1000 times.

Example 3

Figure 8:
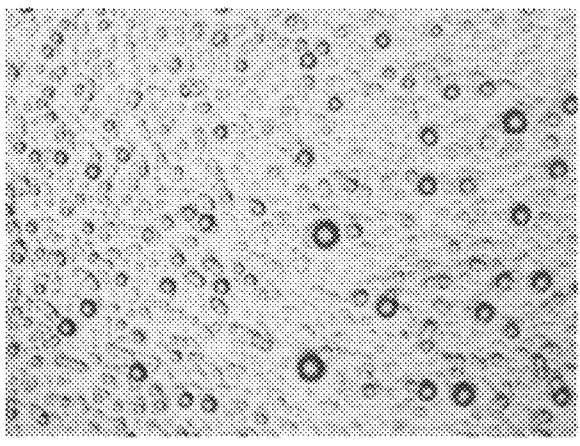
FIG. 8 is a microscopic photograph of magnifying a surface of the overlying light diffusion sheet of Example 3 by 1000 times magnification.

An optical sheet (overlying light diffusion sheet) of Example 3 was prepared by laminating a light diffusion layer on a surface of a base layer, the light diffusion layer being such that resin beads were dispersed in a resin matrix whose main component was a thermosetting resin, and the base layer containing polyethylene terephthalate as its main component and having an average thickness of 125 μm. The resin beads included a mixture of first beads, second beads, and third beads. The first beads had a large average particle diameter (average particle diameter of 5 μm). The second beads had an average particle diameter (average particle diameter of 2 μm) smaller than the first beads. The third beads had an average particle diameter (average particle diameter of 3 μm) smaller than that of the first beads, but larger than that of the second beads. The mixture contained the first beads, the second beads, and the third beads at a ratio of 2:2:1 (mass ratio). A layer amount of the light diffusion layer was 3.5 g/m$^2$, a content of the resin matrix in the light diffusion layer was 49.07% by mass, and an average thickness of the light diffusion layer was 3.5 μm. FIG. 8 is a microscopic photograph of magnifying the surface of the overlying light diffusion sheet of Example 3 by 1000 times.

Example 4

An optical sheet (overlying light diffusion sheet) of Example 4 was prepared by laminating a light diffusion layer on a surface of a base layer, the light diffusion layer being such that resin beads were dispersed in a resin matrix whose main component was a thermosetting resin, and the base layer containing polyethylene terephthalate as its main component and having an average thickness of 125 μm. The resin beads included a mixture of first beads, second beads, and third beads. The first beads had a large average particle diameter (average particle diameter of 7 μm). The second beads had an average particle diameter (average particle diameter of 2 μm) smaller than the first beads. The third beads had an average particle diameter (average particle diameter of 3 μm) smaller than that of the first beads, but larger than that of the second beads. The mixture contained the first beads, the second beads, and the third beads at a ratio of 2:2:1 (mass ratio). A layer amount of the light diffusion layer was 3.5 g/m$^2$, a content of the resin matrix in the light diffusion layer was 50.02% by mass, and an average thickness of the light diffusion layer was 3.5 μm.

Example 5

Figure 9:
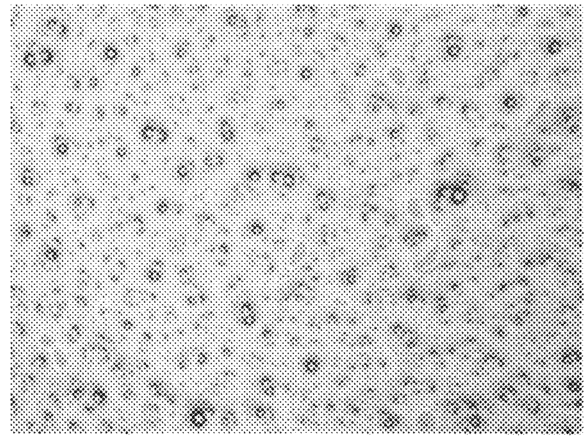
FIG. 9 is a microscopic photograph of magnifying a surface of the overlying light diffusion sheet of Example 5 by 1000 times magnification.

An overlying light diffusion sheet of Example 5 was prepared by laminating a light diffusion layer on the surface of a base layer, the light diffusion layer being such that resin beads were dispersed in a resin matrix whose main component was an UV curable resin, and the base layer being identical with the base layer of Example 2. The resin beads included a mixture of first beads, second beads, and third beads. The first beads had a large average particle diameter (average particle diameter of 7 μm). The second beads had an average particle diameter (average particle diameter of 2 μm) smaller than the first beads. The third beads had an average particle diameter (average particle diameter of 3 μm) smaller than that of the first beads, but larger than that of the second beads. The mixture contained the first beads, the second beads, and the third beads at a ratio of 2:2:1 (mass ratio). A layer amount of the light diffusion layer was 2.0 g/m$^2$, a content of the resin matrix in the light diffusion layer was 70.02% by mass, and an average thickness of the light diffusion layer was 2.0 μm. FIG. 9 is a microscopic photograph of magnifying the surface of the overlying light diffusion sheet of Example 5 by 1000 times.

Comparative Example 1

Figure 10:
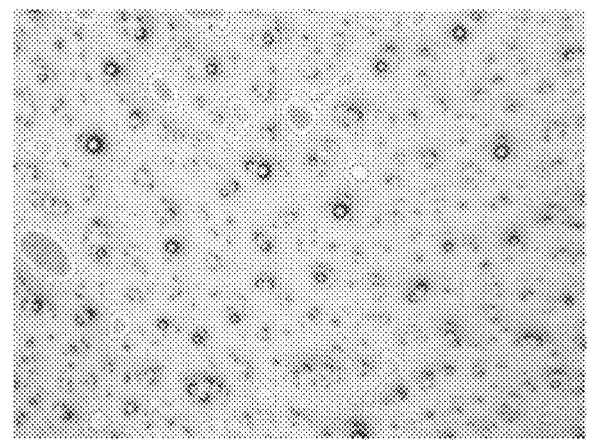
FIG. 10 is a microscopic photograph of magnifying a surface of the overlying light diffusion sheet of Comparative Example 1 by 1000 times magnification.

An overlying light diffusion sheet of Comparative Example 1 was prepared by laminating a light diffusion layer on the surface of a base layer, the light diffusion layer being such that resin beads were dispersed in a resin matrix whose main component was an UV curable resin, and the base layer being identical with the base layer of Example 2. The resin beads included a mixture of first beads and second beads. The first beads had a large average particle diameter (average particle diameter of 7 μm) and the second beads had an average particle diameter (average particle diameter of 2 μm) smaller than the first beads. The mixture contained the first beads and the second beads at a ratio of 1.5:1 (mass ratio). A layer amount of the light diffusion layer was 2.0 g/m$^2$, a content of the resin matrix in the light diffusion layer was 77.09% by mass, and an average thickness of the light diffusion layer was 2.0 μm. FIG. 10 is a microscopic photograph of magnifying the surface of the overlying light diffusion sheet of Comparative Example 1 by 1000 times.

Comparative Example 2

Figure 11:
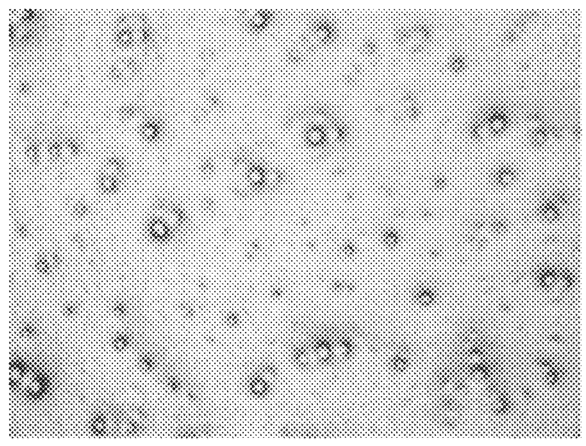
FIG. 11 is a microscopic photograph of magnifying the surface of the overlying light diffusion sheet of Comparative Example 2 by 1000 times magnification.
Figure 12:
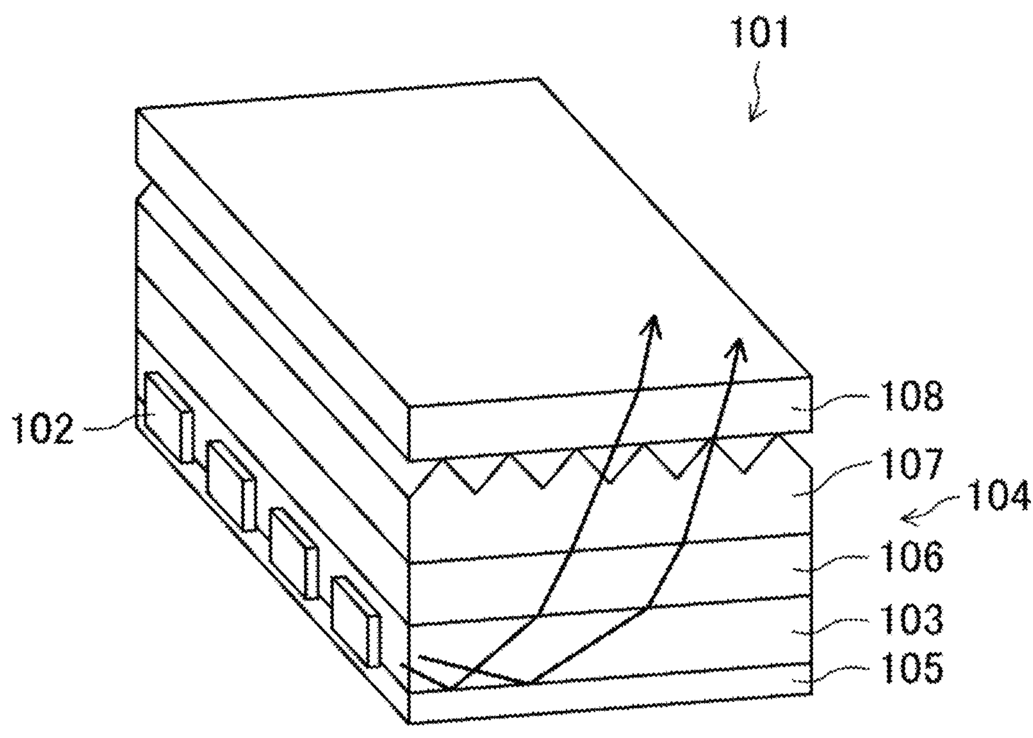
FIG. 12 is a schematic perspective view illustrating a known edge-light type backlight unit.

An overlying light diffusion sheet of Comparative Example 2 was prepared by laminating a light diffusion layer on a surface of a base layer, the light diffusion layer being such that acrylic resin beads of 8 μm in average particle diameter were dispersed in a resin matrix whose main component was an UV curable resin, and the base layer containing polyethylene terephthalate as the main component and having an average thickness of 100 μm. A layer amount of the light diffusion layer was 5.0 g/m$^2$, a content of the resin matrix in the light diffusion layer was 76.19% by mass, and an average thickness of the light diffusion layer was 5.0 μm. FIG. 11 is a microscopic photograph of magnifying the surface of the overlying light diffusion sheet of Comparative Example 2 by 1000 times.

Evaluation Results of Examples

The overlying light diffusion sheets of Examples 1 to 5 and Comparative Examples 1 and 2 were each implemented between a prism sheet and a liquid crystal panel of an edge-light type backlight unit of a liquid crystal display apparatus, and the degree of sparkle was measured in conformity with JIS C 1006: 2019. Table 1 shows the measurement results. The measurement values were "sparkle contrast (unit: %)" of JIS C 1006: 2019. The measurement apparatus used was a measurement apparatus according to specifications of "Measuring Apparatus B" in Appendix A of JIS C 1006: 2019 (SMS-1000 manufactured by DM & S). More specifically, the degree of sparkle was measured in such a way that, in a dark room at a constant temperature and humidity (23° C., 50% RH), the overlying light diffusion sheet was placed with its light diffusion layer on the upper side, above a light source to which a Green film (LEE Color Filter (Model: 124 Dark Green) manufactured by LEE Filters) was pasted, with a Pixel pattern matrix (latest version 2019: 2 mm in thickness, 254 ppi) therebetween, which was an accessory of SMS-1000, and the degree of sparkle was measured in the Sparkle mode. An imaging camera with a 50 mm objective lens was used in the measurement. The distance from the light source to the objective lens was set to approximately 240 mm (Pixel Ratio of SMS-1000 was 6.0), and the exposure time was set to approximately 20 ms. The image filtering process was performed with an application that was an accessory of SMS-1000.

Further, the haze values of the overlying light diffusion sheets of Examples 1 to 5 and Comparative Examples 1 and 2 were measured in conformity with JIS K 7136: 2000, using a haze meter HZ-2 manufactured by Suga Test Instruments Co., Ltd. Table 1 shows the measurement results.

Further, the "arithmetic average roughness Ra" of the surface of each of the overlying light diffusion sheets of Examples 1 to 5 and Comparative Examples 1 and 2 was measured in conformity with JIS B 0601: 2001 with no cutoff and an assessment length of 290 μm. Table 1 shows the measurement results. The "arithmetic average roughness Ra", which is an indicator of profile roughness, was measured with three samples (N1, N2, N3), and Table 1 shows the measurement values of the samples and the average value thereof.

Further, the "peak count RPc" of the surface of each of the overlying light diffusion sheets of Examples 1 to 5 and Comparative Examples 1 and 2 was measured in conformity with JIS B 0601: 2001. Table 1 shows the measurement results. In the measurement of the "peak count RPc" that is an indicator of the profile roughness, the assessment length was set to 290 m, and the dead bandwidths on both sides of the average line were set to 0%. The measurement counted the number of peaks (peak count 2) for 3 samples (N1, N2, N3), where a profile counted as a peak (mountain) was a profile rising from a point just below the average line to go above the average line, and going below the average line again. Table 1 shows the measurement values of the samples and the average value thereof.

In addition, the "mean spacing of profile irregularities Sm" of the surface of each of the overlying light diffusion sheets of Examples 1 to 5 and Comparative Examples 1 and 2 was measured in conformity with JIS B 0601: 1994 with no cutoff and with an assessment length of 290 μm. Table 1 shows the measurement results. The "mean spacing of profile irregularities Sm", which is an indicator of profile roughness, was measured for three samples (N1, N2, N3), and Table 1 shows the measurement values of the samples and the average value thereof.

The "arithmetic average roughness Ra", the "peak count RPc", and the "mean spacing of profile irregularities Sm", which are indices of the profile roughness, were measured using a laser microscope VX-K100 manufactured by KEYENCE CORPORATION. In particular, laser imaging of the target surface was performed with automatic tilt correction in profile roughness mode with a magnification of 1000×, a pitch of 0.20, and a dead bandwidth of 0. The captured image was analyzed by using a VK-X100 dedicated analysis application program.

TABLE 1

| | Sparkle (%) | Haze (%) | Profile Roughness | Arithmetic Average Roughness Ra (μm) | Peak Counts RPc (Counts of Peaks) | Mean Spacing of Profile Irregularities Sm (μm) |
|---|---|---|---|---|---|---|
| Example 1 | 1 | 65 | N1 | 0.3 | 146 | 2 |
| | | | N2 | 0.2 | 158 | 1.8 |
| | | | N3 | 0.2 | 142 | 2 |
| | | | Average | 0.2 | 148.7 | 1.9 |
| Example 2 | 2 | 48 | N1 | 0.4 | 16 | 17.1 |
| | | | N2 | 0.2 | 22 | 12.6 |
| | | | N3 | 0.3 | 23 | 11.9 |
| | | | Average | 0.3 | 20.3 | 13.9 |
| Example 3 | 2 | 65 | N1 | 0.5 | 19 | 13.4 |
| | | | N2 | 0.5 | 21 | 13 |
| | | | N3 | 0.4 | 19 | 11.8 |
| | | | Average | 0.5 | 19.7 | 12.7 |
| Example 4 | 3.5 | 65 | N1 | 0.7 | 14 | 18.3 |
| | | | N2 | 0.5 | 20 | 19.5 |
| | | | N3 | 0.6 | 18 | 16.3 |
| | | | Average | 0.6 | 17.3 | 18 |
| Example 5 | 4 | 65 | N1 | 0.7 | 12 | 25.4 |
| | | | N2 | 0.6 | 15 | 19.1 |
| | | | N3 | 0.5 | 11 | 25.6 |
| | | | Average | 0.6 | 12.7 | 23.4 |
| Comparative Example 1 | 5.5 | 53 | N1 | 0.6 | 15 | 17.9 |
| | | | N2 | 0.6 | 8 | 31.4 |
| | | | N3 | 0.7 | 7 | 32.6 |
| | | | Average | 0.6 | 10 | 27.3 |
| Comparative Example 2 | 8 | 53 | N1 | 0.9 | 6 | 36.2 |
| | | | N2 | 0.6 | 7 | 31 |
| | | | N3 | 1.3 | 5 | 63.4 |
| | | | Average | 0.9 | 6 | 43.5 |

As shown in Table 1, in Examples 1 to 5, it was possible to suppress the sparkle contrast, which was measured in conformity with JIS C 1006: 2019 to about 4% or less. Moreover, it was demonstrated that, when the arithmetic average roughness Ra and the peak count RPc of the surface of the overlying light diffusion sheet are 0.6 μm or less and 16 or more, respectively, the sparkle contrast can be reduced to less than 4% as in Examples 1 to 4. Furthermore, it was demonstrated that, when the arithmetic average roughness Ra, the peak count RPc, and the mean spacing of profile irregularities Sm are 0.5 μm or less, 18 or more, and 20 μm or less, respectively, the sparkle on the display screen attributed to interference between the uneven surface of the overlying light diffusion sheet and the cell array of the liquid crystal panel can be sufficiently suppressed, as in Examples 1 to 3. More specifically, the sparkle contrast can be suppressed to about 3% or less. On the other hand, in Comparative Examples 1 and 2, the sparkle contrast exceeds 5%. More specifically, as in Comparative Examples 1 and 2, when the arithmetic average roughness Ra, the peak count RPc, or the mean spacing of profile irregularities Sm does not fall within the range described above, the sparkle on the display screen cannot be sufficiently suppressed.

Other Embodiments

The above describes embodiments (including modifications and examples; the same applies hereinafter) of the present disclosure. However, the present disclosure is not limited to the aforementioned embodiments, and various modifications are possible within the scope of the disclosure. That is, the above description of the embodiments is solely to serve as an example in nature, and is not intended to limit the present disclosure, applications thereof, or uses thereof.

Specifically, the overlying light diffusion sheet according to the present disclosure may be a two-layer structure with a base layer and a light diffusion layer, or a three-layer structure with a base layer, a light diffusion layer, and an anti-sticking layer, or may have another layer between the base layer and the light diffusion layer or between the base layer and the anti-sticking layer.

In addition to the above embodiments, the backlight unit according to the present disclosure can be implemented in various modified and improved forms. For example, the backlight unit may include an optical sheet other than the overlying light diffusion sheet, the prism sheet, and the underlying light diffusion sheet on the front surface side of the light guide sheet. In addition, the backlight unit is not limited to the edge-light type backlight unit, and may be, for example, a direct type backlight unit in which a diffusion plate and a light source are arranged on the back surface side of the underlying light diffusion sheet. Further, the prism sheet, the light diffusion sheet, the light guide sheet, the light source, and the reflective sheet in the backlight unit are not particularly limited in terms of specific configurations, and may have various configurations.

Further, the backlight unit of the present disclosure can be used in a wide range of applications such as relatively large display devices such as personal computers and liquid crystal televisions, mobile phone terminals such as smartphones, and portable information terminals such as tablet terminals.

Further, in the optical sheet including the base layer and the light diffusion layer formed on the base layer of the above-described embodiments, resin beads are dispersed in the resin matrix, which constitutes the light diffusion layer, so as to form unevenness on the optical sheet. However, instead of this method, the uneven surface may be formed, for example, by using a mold to which the unevenness formed by dispersion of the resin beads in the resin matrix have been transferred, or the unevenness may be formed on an optical sheet by using a laser printer apparatus in which the unevenness are recorded.

Further, the above-described embodiments deal with a case of suppressing the sparkle on the display screen attributed to the interference between the uneven surface of the overlying light diffusion sheet of the backlight unit and the cell array of the liquid crystal panel. However, the present disclosure is not limited to this. For example, an optical sheet with a configuration similar to the overlying light diffusion sheet of the present disclosure is applicable to a surface element for display devices such as CRTs or flat panel displays, or for touch panels and the like used for such a display device to suppress the sparkle on the display screen.

The invention claimed is:

1. An optical sheet, wherein at least a first surface of the optical sheet has unevenness, wherein a sparkle contrast of the first surface is 4% or less, wherein the sparkle contrast is measured in conformity with JIS C 1006: 2019, wherein the optical sheet is an overlying light diffusion sheet to be disposed on a light emitting surface of a prism sheet in a backlight unit, wherein the overlying light diffusion sheet is an independent sheet separated from the prism sheet, and the overlying light diffusion sheet and the prism sheet are not physically joined together, wherein the prism sheet includes a ridge-like prism part on the light emitting surface, wherein the overlying light diffusion sheet is disposed to face the light emitting surface of the prism sheet on which the ridge-like prism part is provided, wherein the overlying light diffusion sheet comprises a base layer and a light diffusion layer provided on the base layer and having the first surface, wherein the unevenness is formed by dispersing resin beads in a resin matrix, which constitutes the light diffusion layer.

2. The optical sheet of claim 1, wherein a haze value thereof is 40% or more, but not more than 70%.

3. The optical sheet of claim 1, wherein:

an arithmetic average roughness Ra of the first surface is 0.6 μm or less, where the arithmetic average roughness Ra is measured in conformity with JIS B 0601: 2001 (with an assessment length set to 290 μm), and a peak count RPc of the first surface is 16 or more, where the peak count RPc is measured in conformity with JIS B 0601: 2001 (with an assessment length set to 290 μm).

4. The optical sheet of claim 3, wherein:

the arithmetic average roughness Ra is 0.5 μm or less, and the peak count RPc is 18 or more.

5. The optical sheet of claim 3, wherein a mean spacing of profile irregularities Sm of the first surface is 20 μm or less, where the mean spacing of profile irregularities Sm is measured in conformity with JIS B 0601: 1994 (with an assessment length set to 290 μm).

6. The optical sheet of claim 1, wherein a refractive index difference between the resin matrix and the resin beads is 0.05 or less.

7. A backlight unit of a liquid crystal display apparatus, comprising:

a light source;

a prism sheet for receiving light from the light source, the prism sheet including a ridge-like prism part on a light emitting surface of the prism sheet; and an overlying light diffusion sheet disposed on the light emitting surface of the prism sheet, the overlying light diffusion sheet being the optical sheet of claim 1.

8. A liquid crystal display apparatus, comprising:

the backlight unit of claim 7; and a liquid crystal display panel.

9. An information device, comprising the liquid crystal display apparatus of claim 8.

* * * * *